(12) United States Patent
Paryani

(10) Patent No.: US 8,818,272 B2
(45) Date of Patent: Aug. 26, 2014

(54) SYSTEM AND METHOD FOR REMOTELY CONTROLLING BLUETOOTH ENABLED ELECTRONIC EQUIPMENT

(75) Inventor: Harish Paryani, San Marcos, CA (US)

(73) Assignee: Broadcom Corporation, Irvine, CA (US)

( * ) Notice: Subject to any disclaimer, the term of this patent is extended or adjusted under 35 U.S.C. 154(b) by 1074 days.

(21) Appl. No.: 11/879,938

(22) Filed: Jul. 18, 2007

(65) Prior Publication Data

US 2009/0023389 A1    Jan. 22, 2009

(51) Int. Cl.
*H04B 7/00* (2006.01)

(52) U.S. Cl.
USPC ......... 455/41.2; 455/41.3; 455/418; 455/419; 455/420; 455/557; 455/417; 455/404.1; 700/18; 700/19; 700/20; 700/24; 700/25; 700/83; 700/86; 700/87

(58) Field of Classification Search
USPC ......... 455/41.2, 418–420, 557, 417, 41.3, 41, 455/1, 404.1; 715/705; 700/18–20, 24–25, 700/83, 86–87
See application file for complete search history.

(56) References Cited

U.S. PATENT DOCUMENTS

| | | | | |
|---|---|---|---|---|
| 6,400,996 | B1 * | 6/2002 | Hoffberg et al. | 700/83 |
| 6,640,145 | B2 * | 10/2003 | Hoffberg et al. | 700/83 |
| 6,772,331 | B1 * | 8/2004 | Hind et al. | 713/151 |
| 6,925,378 | B2 * | 8/2005 | Tzamaloukas | 701/428 |
| 7,151,966 | B1 * | 12/2006 | Baier et al. | 700/19 |
| 2002/0077077 | A1 * | 6/2002 | Rezvani et al. | 455/410 |
| 2004/0203373 | A1 * | 10/2004 | Ogino et al. | 455/41.2 |
| 2004/0203381 | A1 * | 10/2004 | Cahn et al. | 455/41.2 |
| 2004/0203690 | A1 * | 10/2004 | Sprigg et al. | 455/419 |
| 2005/0216606 | A1 * | 9/2005 | Hayes et al. | 710/5 |
| 2006/0133414 | A1 * | 6/2006 | Luoma et al. | 370/466 |
| 2006/0258289 | A1 * | 11/2006 | Dua | 455/41.3 |
| 2007/0050054 | A1 * | 3/2007 | Sambandam Guruparan et al. | 700/65 |
| 2008/0092043 | A1 * | 4/2008 | Trethewey | 715/705 |

* cited by examiner

*Primary Examiner* — Ganiyu A Hanidu
(74) *Attorney, Agent, or Firm* — Oblon, Spivak, McClelland, Maier & Neustadt, L.L.P.

(57) ABSTRACT

According to one exemplary embodiment, a system providing remote control of Bluetooth enabled electronic equipment comprises Bluetooth enabled electronic equipment for initiating a pairing mode to authorize a virtual remote controller transfer, a Bluetooth enabled wireless device for activating a setup mode so as to pair with the Bluetooth enabled electronic equipment and for downloading the virtual remote controller. The virtual remote controller may be described in an advanced markup language, for example. In one embodiment, a method for utilizing a Bluetooth enabled wireless device to remotely control a Bluetooth enabled electronic equipment comprises initiating a pairing mode of the Bluetooth enabled electronic equipment to authorize a virtual remote controller transfer, activating a setup mode of the Bluetooth enabled wireless device so as to pair with the Bluetooth enabled electronic equipment, and downloading the virtual remote controller to the Bluetooth enabled wireless device.

18 Claims, 5 Drawing Sheets

SYSTEM AND METHOD FOR REMOTELY CONTROLLING BLUETOOTH ENABLED ELECTRONIC EQUIPMENT

BACKGROUND OF THE INVENTION

1. Field of the Invention

The present invention relates generally to electronic systems and circuits. More particularly, the present invention relates to wireless communications systems and circuits.

2. Background Art

Many of today's consumer electronics come from the manufacturer accompanied by a remote control unit that allows a user to operate the electronic equipment from a distance, while sitting in a chair located across a room, for example. These remote control units utilize various technologies, for example infrared (IR) signaling, or a radio frequency Bluetooth connection, to communicate commands to the electronic equipment. Typically, a code is assigned to electronic equipment, based on equipment type, e.g. television or DVD, manufacturer, and model number. Interoperability of a particular item of electronic equipment and a particular remote control depends on whether the appropriate code is available to the remote control, for example through a database stored in the remote control. Traditionally, for example, the remote control units provided by electronic equipment manufacturers have often been IR based, dedicated remote controls, usable only with electronic equipment of the same type and model, produced by the same manufacturer.

Despite their convenience, use of conventional remote controls may involve certain disadvantages as well. Because they are small and portable, remote controls can be easily misplaced or even permanently lost. Because in addition to being small and portable, they include sensitive electronic circuits, they can also be susceptible to inoperability due to damage or breakage. When a remote control is lost or damaged, the user may be faced with the inconvenience and expense of procuring a costly replacement from the electronic equipment manufacturer.

Another disadvantage associated with remote controls flows from their very desirability. Because they are convenient and popular, they are provided as accessories with an increasingly wide array of electronic equipment. As a result, and because the manufacturer provided remote controls are frequently dedicated ones, there is an increasing proliferation of distinct remote control units to keep track of, and use. To take a familiar example, a typical home entertainment system might include a television, satellite set-top box, DVD player, audio receiver, and digital audio player, for example, each having its own manufacturer provided, dedicated, remote control unit.

A conventional approach to resolving the disadvantages discussed above, utilizes a programmable "universal" remote control, either as a substitute for a lost or damaged unit, or to replace several distinct remote controls, by integrating some of their functionality into a single unit. This conventional approach offers certain advantages, including relatively low cost, when compared to obtaining a manufacturer replacement, and operational consolidation, allowing at least rudimentary control of multiple devices. Drawbacks associated with use of a conventional universal remote control are significant as well, however. The dedicated remote control provided by the manufacturer of electronic equipment is likely to reflect the full functionality of that equipment. As consumer electronics have increased in function and sophistication, the control layout of their remote control units have grown ever more distinctive. A universal remote control, by contrast, adapted for use with electronic equipment of varying type, e.g. television and DVD, as well as with varying manufacturer and model, are almost of necessity generic in format, including only those controls that are widely shared amongst electronic equipment, for example, volume and channel controls. As a result, customized, manufacturer specific or model specific controls, which may be highly desirable to a user, are likely to be absent from universal remote control layouts. Consequently, while supporting primitive operation of a range of electronic equipment, a universal remote control rarely commands the full functionality of any individual piece of equipment.

Thus, there is a need in the art for a system and method for remotely controlling a variety of electronic equipment, which can implement commonly utilized wireless communications devices for use as remote control units, and which captures the full functionality of the electronic equipment so controlled.

SUMMARY OF THE INVENTION

A system and method for remotely controlling Bluetooth enabled electronic equipment, substantially as shown in and/or described in connection with at least one of the figures, and as set forth more completely in the claims.

DETAILED DESCRIPTION OF THE INVENTION

The present invention is directed to a system and method for remotely controlling Bluetooth enabled electronic equipment. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely exemplary embodiments of the invention. To maintain brevity, other embodiments of the invention, which use the principles of the present invention are not specifically described in the present application and are not specifically illustrated by the present drawings.

Figure 1:
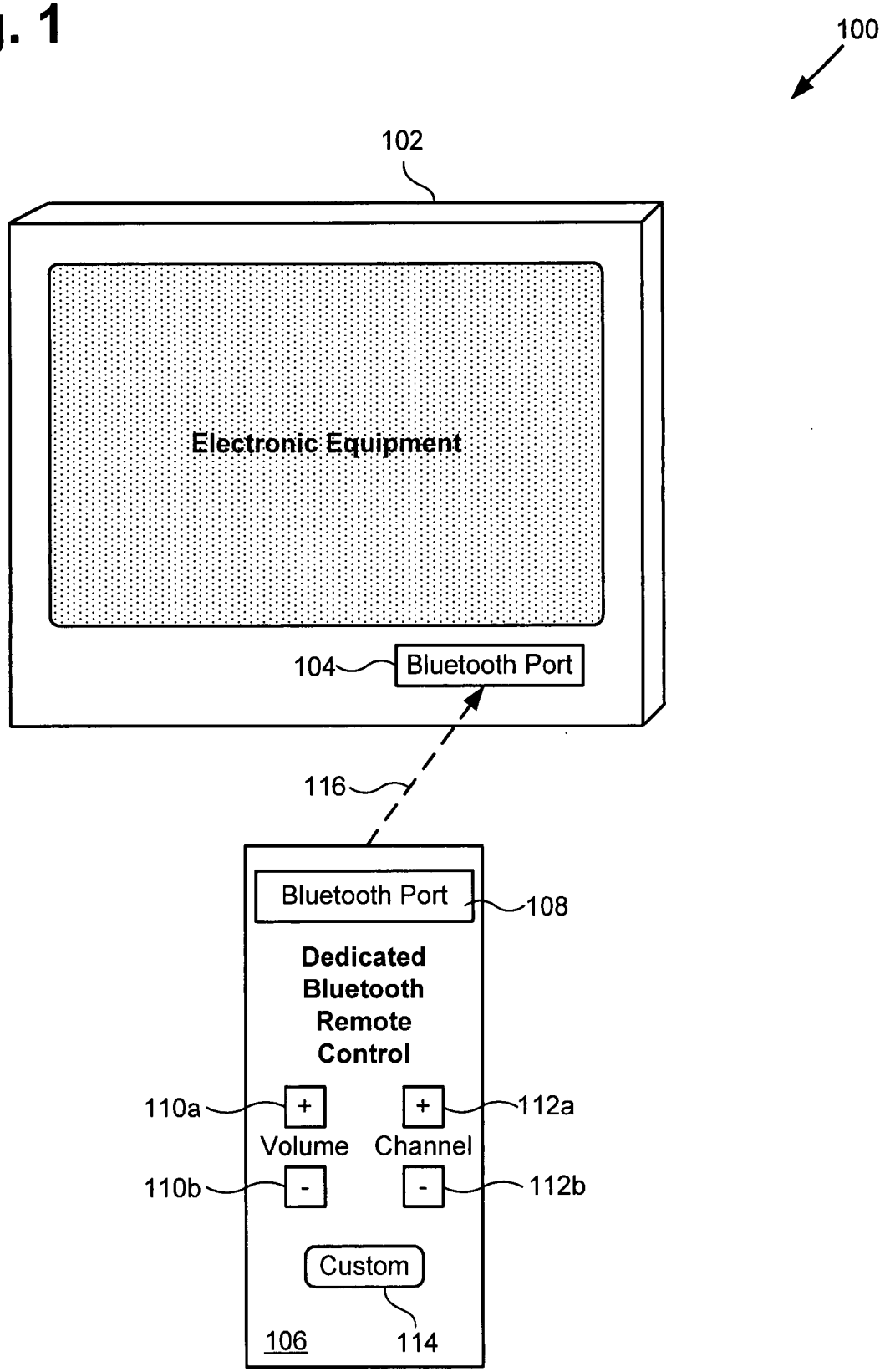
FIG. 1 shows a conventional system for remotely controlling Bluetooth enabled electronic equipment.

FIG. 1 shows a conventional system for remotely controlling Bluetooth enabled electronic equipment. FIG. 1 shows system 100 comprising Bluetooth enabled electronic equipment 102 and dedicated Bluetooth remote control 106. Bluetooth enabled electronic equipment 102 is shown equipped with Bluetooth port 104. Bluetooth enabled electronic equipment 102 may comprise a television, for example. Also shown in FIG. 1, are dedicated Bluetooth remote control features, including Bluetooth port 108, volume controls 110*a* and 110*b*, channel controls 112*a* and 112*b*, and custom control 114. Custom control 114 may be, for example, a manufacturer specific or electronic equipment model specific feature providing control over a functionality that is unique or distinctive to Bluetooth enabled electronic equipment 102. More specifically, where Bluetooth enabled electronic equipment 102 is a television, volume controls 110*a* and 110*b*, and channel controls 112*a* and 112*b* correspond to features that are shared by substantially all televisions regardless of manufacturer or model. Custom control 114, by contrast, may correspond to a picture in picture functionality, for example, unique to a manufacturer, or offered only on certain television models. Communication link 116 in FIG. 1 represents communication between dedicated Bluetooth remote control 106 and Bluetooth enabled electronic equipment 102, permitting remote control over Bluetooth enabled electronic equipment 102.

Bluetooth enabled electronic equipment 102 and dedicated Bluetooth remote control 106 are typically preset by the manufacturer and are available to a consumer as paired devices. Provided as described, both Bluetooth enabled electronic equipment 102 and dedicated Bluetooth remote control 106 may be mutually dedicated system components, lacking interoperability with most other devices. In conventional implementations, for example, a device code may be assigned to Bluetooth enabled electronic equipment 102, based on equipment type, i.e. television versus DVD player, manufacturer, and model number. Interoperability of dedicated Bluetooth remote control 106 and Bluetooth enabled electronic equipment 102 then results from dedicated Bluetooth remote control 106 having been preset with the appropriate device code to control Bluetooth enabled electronic equipment 102.

As previously discussed, the conventional implementation providing remote control of electronic equipment includes several disadvantages. For example, remote control units, such as dedicated Bluetooth remote control 106, in FIG. 1, are frequently small, and tend to be fragile. As a result, they are easily misplaced or permanently lost, and are susceptible to being damaged. Moreover, because dedicated Bluetooth remote control 106 and Bluetooth enabled electronic equipment 102 are pre-paired by the manufacturer, loss or inoperability of dedicated Bluetooth remote control 106 necessitates procurement of a replacement remote control unit from the manufacturer, perhaps at considerable cost, or use of a "universal" remote control unit equipped with a database of device codes which includes the specific device code for Bluetooth enabled electronic equipment 102.

Use of a universal remote control as a replacement for dedicated Bluetooth remote control 106 also addresses the additional problems arising from the inconvenience of having multiple items of electronic equipment, each controlled by a separate dedicated remote control. Where, for example, a relatively modest home entertainment center includes a television, satellite set-top box, and DVD player, each device may have it's own dedicated remote control, requiring synchronized use of all three remote control units to operate what is effectively employed as an integrated entertainment system. Many home entertainment systems are somewhat more elaborate, and may include, for example, an audio receiver and digital music player, with their own dedicated remote controls. The frustrations and inconveniences resulting from such a proliferation of remote control units may be readily apparent, or perhaps even familiar.

While capable of providing a primitive replacement for a lost or broken remote control unit, and offering an alternative to the tyranny of remote control proliferation, universal remote control units present significant undesirable aspects as well. For example, a universal remote control is limited in its interoperability to those items of electronic equipment for which device codes are available through the universal remote control database. As a result, a single universal device purchased to consolidate the use of several dedicated remote control units, may be interoperable with some but not all of electronic equipment in use. Even where interoperability does exist, the very universality of a universal remote control unit may prevent it from commanding the full functionality of any individual item of electronic equipment.

Returning to FIG. 1, it may be seen that where a universal remote control unit is utilized as a replacement for dedicated Bluetooth remote control 106, that universal remote control, because it is adapted for use with a variety of equipment types and models, may not support control over controls or features that are unique or distinctive to an equipment type, manufacturer, or model. For example, while volume controls 110*a* and 110*b*, and channel controls 112*a* and 112*b* on dedicated Bluetooth remote control 106 may be generic across a wide variety of electronic equipment and thus be replicated on a universal remote control, custom control 114 may be highly distinctive, and not be supported by a universal remote control unit, even where that universal unit is interoperable with Bluetooth enabled electronic equipment 102. Considering the variety and sophistication of electronic equipment available on the market, it seems inevitable that a universal remote device would be unable to replicate every distinctive control of each device with which it is interoperable. However, it is often those unique or distinctive control features that make a particular item of electronic equipment desirable over a competing product. Thus the failure of a universal remote control unit to replicate those custom controls may make it an inadequate substitute for a dedicated remote control, such as dedicated Bluetooth remote control 106 in FIG. 1.

Figure 2:
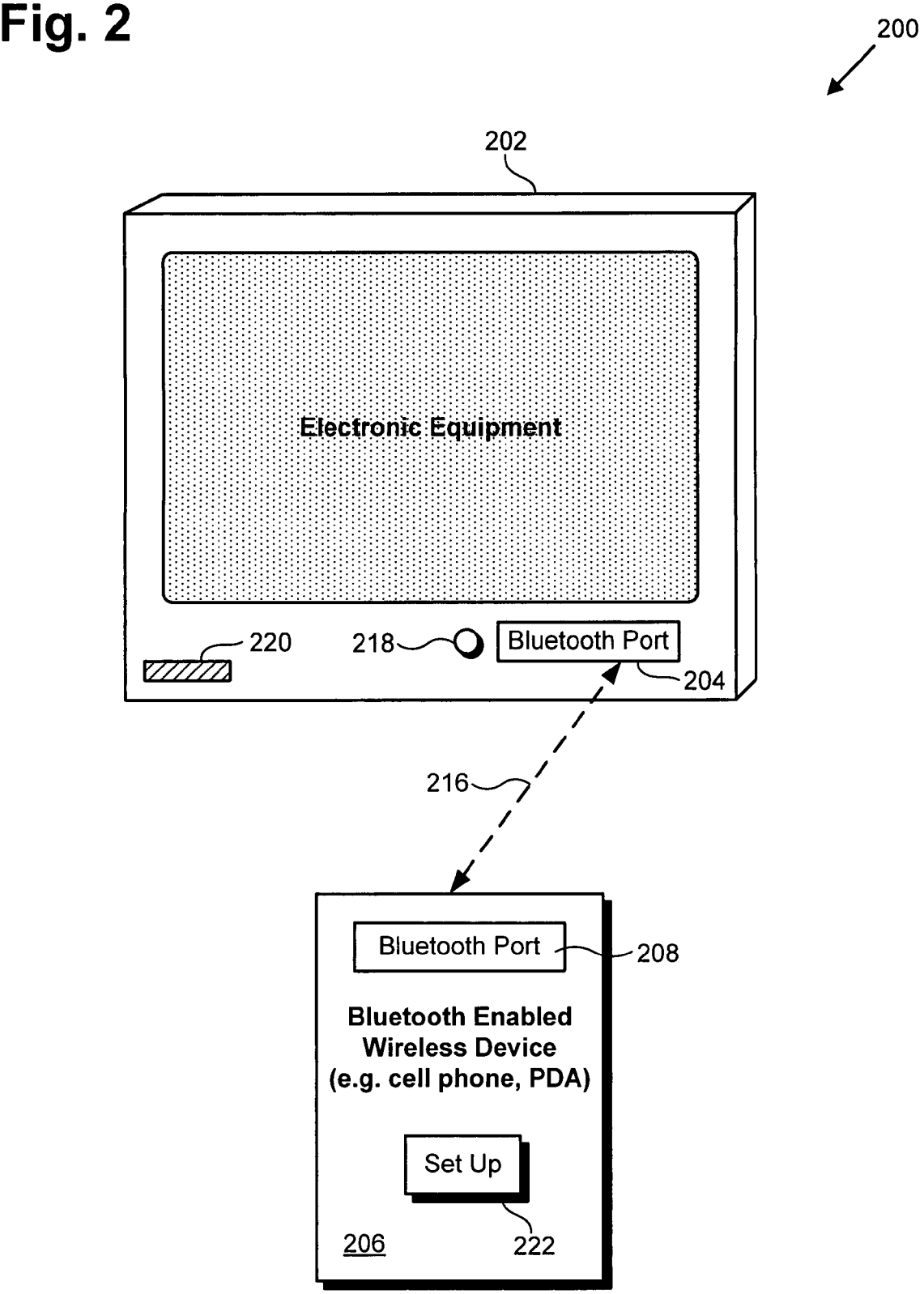
FIG. 2 shows a system for remotely controlling Bluetooth enabled electronic equipment using a Bluetooth enabled wireless device, according to one embodiment of the present invention.

FIG. 2 shows a system for remotely controlling Bluetooth enabled electronic equipment using a Bluetooth enabled wireless device, according to one embodiment of the present invention, capable of overcoming the inadequacies of conventional implementations discussed in relation to FIG. 1. FIG. 2 shows system 200, comprising Bluetooth enabled electronic equipment 202 equipped with Bluetooth port 204, corresponding to Bluetooth enabled electronic equipment 102 having Bluetooth port 104, in FIG. 1. System 200 in FIG. 2 also comprises Bluetooth enabled wireless device 206, which substitutes for dedicated Bluetooth remote control 106, in FIG. 1.

Bluetooth enabled electronic equipment 202 in FIG. 2 includes Bluetooth pairing button 218 and security code 220, having no analogue in FIG. 1. For the purposes of the present discussion, Bluetooth enabled electronic equipment 202 may be described as a television. This characterization is exemplary only, however. Bluetooth enabled electronic equipment 202 may comprise any Bluetooth enabled electronic equipment configured to be remotely controlled, including, but not limited to, the aforementioned television, a DVD player, video receiver, audio receiver, satellite set-top box, home security system, and home appliance, for example.

As shown by communication link 216 in FIG. 2, Bluetooth enabled electronic equipment 202 is in communication with Bluetooth enabled wireless device 206, from which it may receive commands. Bluetooth enabled wireless device 206 includes Bluetooth port 208 and set-up button 222. As is the case for Bluetooth enabled electronic equipment 202, there is considerable variability in the specific form assumed by Bluetooth enabled wireless device 206. For the purposes of the present discussion, Bluetooth enabled device 206 may be conceptualized as a mobile telephone, but that characterization too, is merely exemplary. Bluetooth enabled wireless device may be any such device suitable for use as a remote control unit, including, but not limited to, the aforementioned mobile telephone, a personal digital assistant (PDA), wireless computer, wireless keyboard, digital audio player, and gaming console, for example. The embodiment presented in FIG. 2 may be more clearly understood if considered in conjunction with an exemplary method for implementing remote control through its use.

Figure 3:
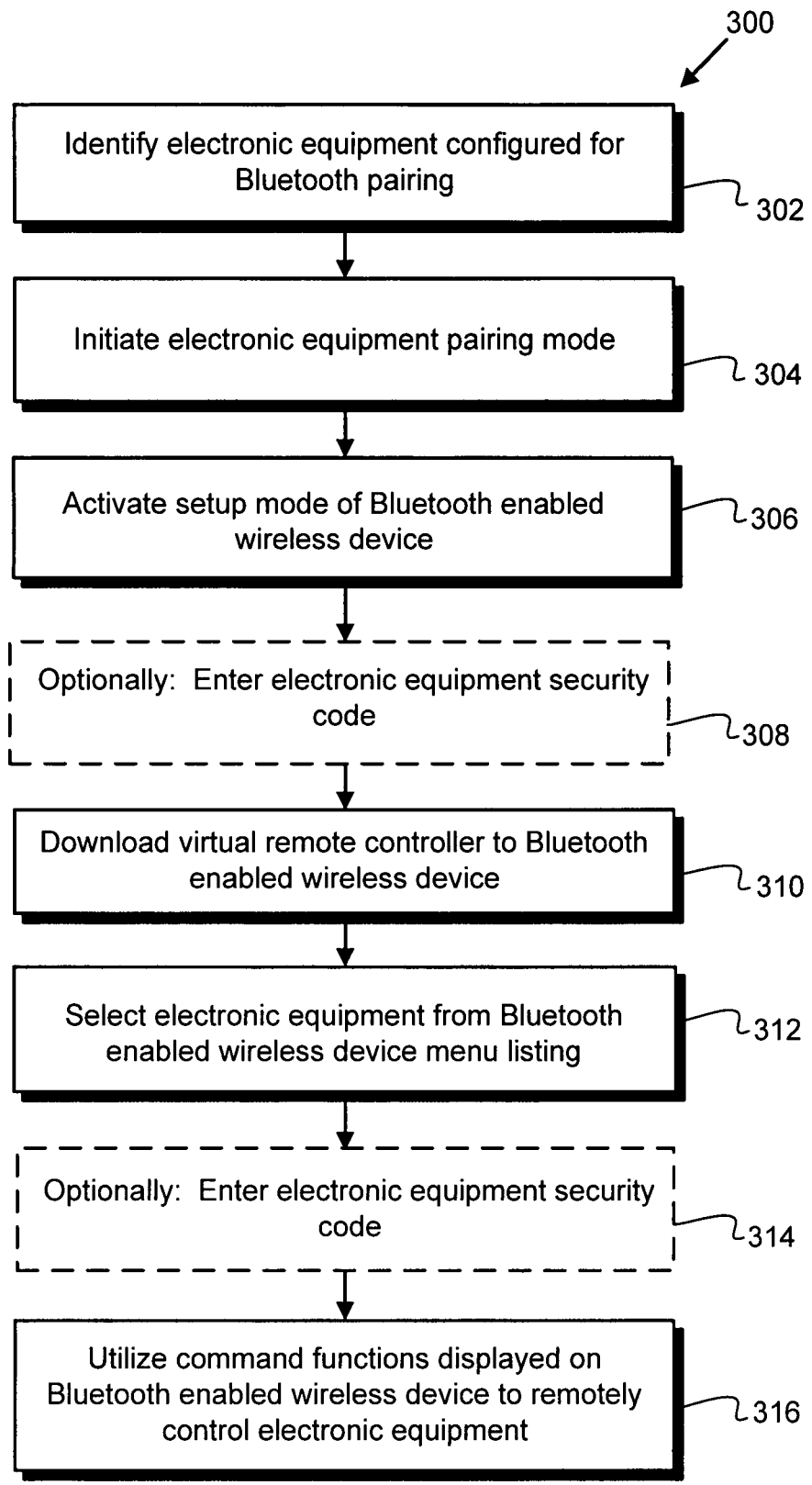
FIG. 3 shows a flow chart of an exemplary method to implement an embodiment of the present invention.

FIG. 3 shows flow chart 300, which outlines an exemplary method to implement an embodiment of the present invention. Certain details and features have been left out of flow-chart 300 that are apparent to a person of ordinary skill in the art. For example, a step may comprise one or more substeps or may involve specialized equipment or materials, as known in the art. While steps 302 through 316 indicated in flowchart 300 are sufficient to describe one embodiment of the present invention, other embodiments of the invention may utilize steps different from those shown in flowchart 300.

Continuing with step 302 in FIG. 3 and system 200 in FIG. 2, step 302 of flowchart 300 comprises identifying electronic equipment configured for Bluetooth pairing. Bluetooth enabled electronic equipment 202 is an example of a suitably configured device, by virtue of the presence of Bluetooth pairing button 218. In the conventional implementation, shown in FIG. 1, Bluetooth enabled electronic equipment 102 is provided by the manufacturer pre-paired with dedicated Bluetooth remote control 106. Although interoperability may be present for a universal remote control unit, such a device is also a pre-paired device by virtue of the device codes preset into it. Active pairing between Bluetooth enabled electronic equipment 102 and a remote control device is not under a user's control in the conventional implementation.

Active pairing is not a desirable default mode for Bluetooth enabled electronic equipment, because in the presence of other Bluetooth enabled electronic equipment or control devices, the ability to continuously pair would give rise to undesirable cross-talk amongst the electronic equipment and controls. To avoid that outcome, the present embodiment calls for Bluetooth enabled electronic equipment 202 to reside in a default non-pairing state, but to have a manual control allowing a user to place the electronic equipment into a Bluetooth pairing mode. Bluetooth pairing button 218, which is exemplary only, provides for that feature in FIG. 2. In other embodiments, Bluetooth pairing button 218 may correspond to a Bluetooth pairing switch, or knob, for example, or any control suitable for placing Bluetooth enabled electronic equipment 202 into a Bluetooth pairing mode.

Step 304 in FIG. 3 comprises initiating the Bluetooth pairing mode of Bluetooth enabled electronic equipment 202 in FIG. 2, by utilizing Bluetooth pairing button 218. In pairing mode, Bluetooth enabled electronic equipment can broadcast its presence to other Bluetooth enabled devices, and autonegotiate interoperability, as known in the art. By manually placing Bluetooth enabled electronic equipment 202 into a pairing mode, Bluetooth enabled electronic equipment 202 is made temporarily detectable by Bluetooth enabled devices that may be searching for a pairing partner, such as Bluetooth enabled wireless device 206, in FIG. 2.

Moving on to step 306 in FIG. 3, step 306 of flowchart 300 comprises activating a setup mode of Bluetooth enabled wireless device 206, in FIG. 2. Bluetooth enabled electronic equipment 202 having been placed into a pairing mode in the previous step, activating a setup mode in the present step prompts Bluetooth enabled wireless device 206 to search for Bluetooth enabled electronic equipment 202 and autonegotiate pairing. Optionally, at step 308 of flowchart 300, manual authorization for pairing may be required. Authorization can be provided by entry of security code 220 identifying Bluetooth enabled electronic equipment 202, in response to a prompt appearing on Bluetooth enabled wireless device 206, for example.

Following pairing of Bluetooth enabled electronic equipment 202 and Bluetooth enabled wireless device 206 in step 306 or 308, an application constituting a virtual remote controller is downloaded to Bluetooth enabled wireless device 206, in step 310 of flowchart 300. In the present embodiment, the virtual remote controller is transferred by wirelessly downloading same into Bluetooth enabled wireless device 206. In one embodiment, the virtual remote controller is stored in Bluetooth enabled electronic equipment 202 in the form of Extensible Markup Language (XML) files, and transferred to Bluetooth enabled wireless device 206 though communication link 216. In other embodiments, the virtual remote controller application is described using other advanced markup languages, for example. Further, in one embodiment, the virtual remote controller is streamed into Bluetooth enabled wireless device 206 through communication link 216 and through the electronic equipment's connection to the Internet, without having the virtual remote controller necessarily stored first in the electronic equipment.

Steps 302 through 310 may be repeated using the same Bluetooth enabled wireless device 206 in conjunction with several different items of Bluetooth enabled electronic equipment, consolidating control of multiple electronic equipment into Bluetooth enabled wireless device 206. In step 312 of FIG. 3, a particular item of Bluetooth enabled electronic equipment with which Bluetooth enabled wireless device 206 has paired, is selected from a menu displayed on Bluetooth enabled wireless device 206. In one embodiment, selection of previously paired Bluetooth enabled electronic equipment 202 in step 312 results in automatic display of remote control functions specific to Bluetooth enabled electronic equipment 202 through the graphical user interface (GUI) of Bluetooth enabled wireless device 206.

Optionally, selection of Bluetooth enabled electronic equipment 202 in step 312 may result in a prompt requesting manual authorization for display and control of the selected equipment. Manual authorization can be provided in step 314 by entry of security code 220 identifying Bluetooth enabled electronic equipment 202, for example.

Continuing with step 316 in FIG. 3, step 316 of flowchart 300 comprises utilizing the command functions displayed on Bluetooth enabled wireless device 206 to remotely control Bluetooth enabled electronic equipment 202. It is noted that because Bluetooth enabled wireless device 206 is running a virtual remote controller application specific to Bluetooth enabled electronic equipment 202, its display replicates controls corresponding to the full functionality of Bluetooth enabled electronic device 202, including unique or distinctive functions, such as custom control 114, in FIG. 1, heretofore accessible through use of a dedicated Bluetooth remote control but not typically supported by conventional universal remote control units.

Figure 4:
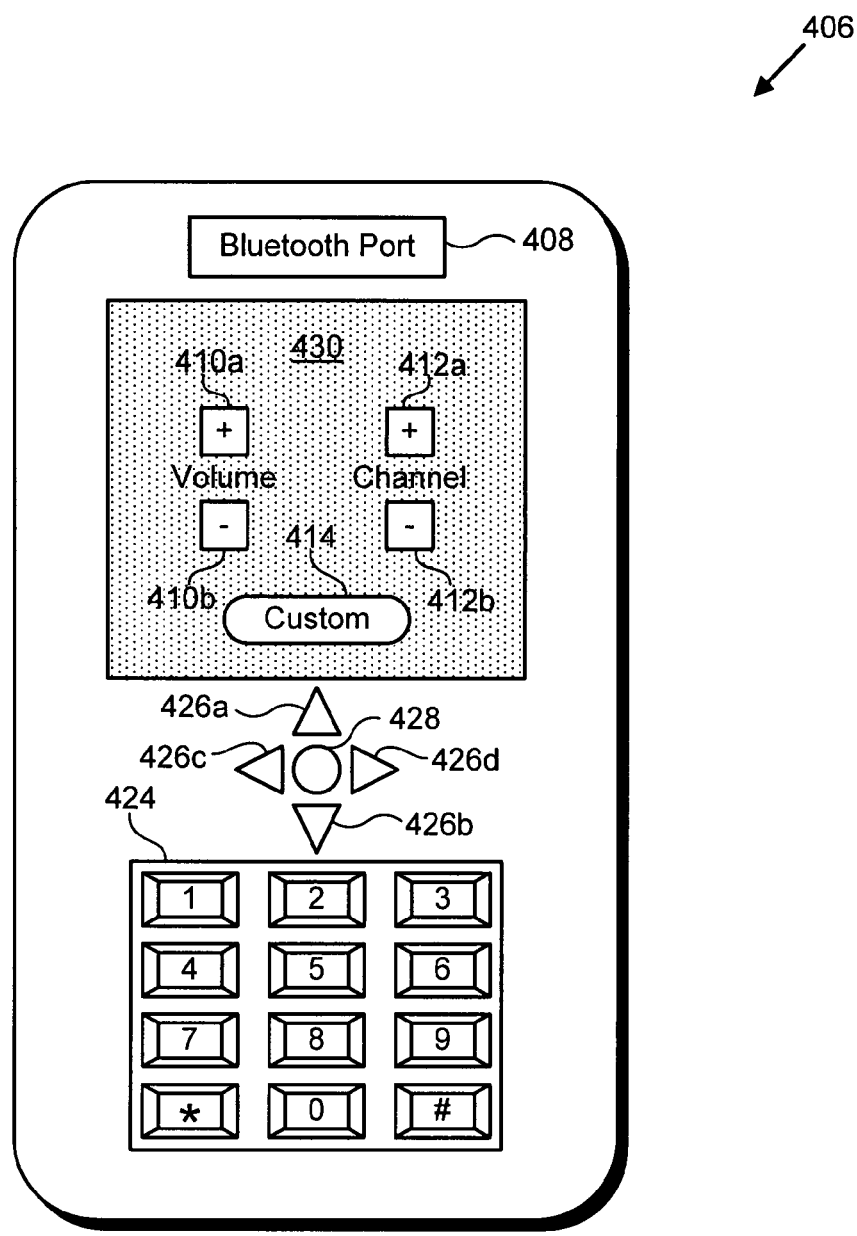
FIG. 4 shows an exemplary Bluetooth enabled wireless device for remotely controlling Bluetooth enabled electronic equipment, according to one embodiment of the present invention.

FIG. 4 shows an exemplary Bluetooth enabled wireless device for remotely controlling Bluetooth enabled electronic equipment, according to one embodiment of the present invention. Bluetooth enabled mobile telephone 406 in FIG. 4 corresponds to Bluetooth enabled wireless device 206 in FIG. 2, which, in turn, substitutes for dedicated Bluetooth remote control 106, in FIG. 1. Bluetooth enabled mobile telephone 406 comprises Bluetooth port 408, keypad 424, directional cursor controls 426a, 426b, 426c, and 426d, select button 428, and display 430. As shown in FIG. 4, when Bluetooth enabled mobile telephone 406 is paired with Bluetooth enabled electronic equipment, such as Bluetooth enabled electronic equipment 202, in FIG. 2, the full functionality of the electronic equipment is commanded by the controls provided on display 430.

In the embodiment of FIG. 4, display 430 shows not only controls common to most electronic equipment, like volume controls 410a and 410b, and channel controls 412a and 412b, but custom control 414 as well. As a result, Bluetooth enabled mobile phone 406 may be utilized as a substitute for a dedicated Bluetooth remote control, such as dedicated Bluetooth remote control 106, in FIG. 1, without relinquishing command of custom functions unique or distinctive to a particular item of electronic equipment. In FIG. 4, directional cursor controls 426a, 426b, 426c, and 426d can be used to navigate amongst the control functions presented on display 430. When a desired control in highlighted, select button 428 can be depressed to execute the desired command. It is noted that volume controls 410a and 410b, channel controls 412a and 412b, and custom control 414, are exemplary only, and are not limitations on the number or variety of controls capable of display by Bluetooth enabled mobile telephone 406 or any other embodiment of the present invention.

Figure 5:
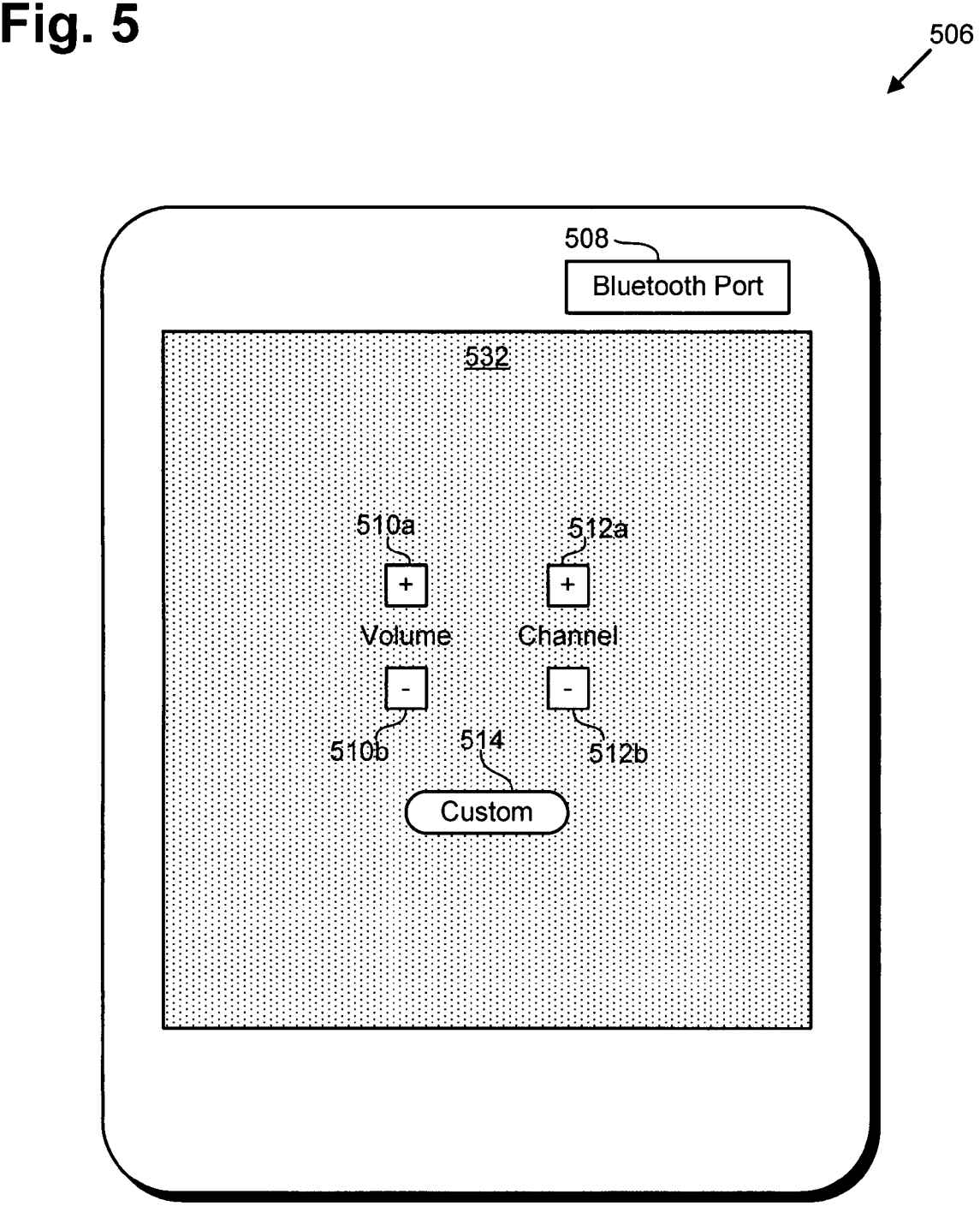
FIG. 5 shows an exemplary Bluetooth enabled wireless device for remotely controlling Bluetooth enabled electronic equipment, according to another embodiment of the present invention.

FIG. 5 shows an exemplary Bluetooth enabled wireless device for remotely controlling Bluetooth enabled electronic equipment, according to another embodiment of the present invention. Bluetooth enabled wireless device 506 in FIG. 5 is a touch screen device comprising Bluetooth port 508, and touch screen display 532. Bluetooth enabled wireless device 506 in FIG. 5 corresponds to Bluetooth enabled wireless device 206 in FIG. 2, and may be utilized as a substitute for dedicated Bluetooth remote control 106, in FIG. 1, without sacrificing command of functionality that may be unique or distinctive to a particular item of electronic equipment. As shown in FIG. 5, when Bluetooth enabled wireless device 506 is paired with Bluetooth enabled electronic equipment, such as Bluetooth enabled electronic equipment 202, in FIG. 2, the full functionality of the electronic equipment is commanded by the controls provided on display 532.

In the embodiment of FIG. 5, display 532 shows controls common to most electronic equipment, like volume controls 510a and 510b and channel controls 512a and 512b, as well as custom control 514. Consequently, Bluetooth wireless device 506, which may be a tablet computer, or touch screen mobile telephone for example, can be utilized as a substitute for a dedicated Bluetooth remote control, such as dedicated Bluetooth remote control 106, in FIG. 1, without relinquishing command of custom functions unique or distinctive to a particular item of electronic equipment. In FIG. 5, an icon representing volume control 510a or 510b, or channel control 512a or 512b, or custom control 514 can be directly touched to execute the corresponding command.

By pairing a Bluetooth enabled wireless device with one or more items of Bluetooth enabled electronic equipment, the present invention makes it possible to consolidate remote control of multiple items of electronic equipment without sacrificing command of distinctive or unique functionality specific to an individual item of electronics. Moreover, by providing a means for integrating a virtual remote controller application into a variety of popular and widely distributed Bluetooth enabled wireless devices, the present invention both broadens the utility of those existing devices and eliminates the necessity for a consumer to purchase a separate dedicated or universal remote control unit. As a result, the present invention advantageously provides a fully functional substitute for a lost or damaged dedicated remote control without a user suffering the delay or expense associated with procurement of a replacement unit. In addition, the present invention advantageously provides a user with the flexibility to select a remote control device based on convenience or other criteria of personal preference, such as display type or ease of use, for example.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

Thus, system and method for remotely controlling Bluetooth enabled electronic equipment have been described.

The invention claimed is:

1. A system comprising:
a Bluetooth enabled electronic equipment configured to initiate a pairing mode to authorize a virtual remote controller transfer, the pairing mode being initiated responsive to actuation of a selectable control disposed on said Bluetooth enabled electronic equipment, the Bluetooth enabled electronic equipment being in a default non-pairing state when not in pairing mode to reduce cross-talk; and
a Bluetooth enabled wireless device configured to activate a setup mode to pair with said Bluetooth enabled electronic equipment, and configured to stream from the Internet said virtual remote controller without the virtual remote controller being first stored on the Bluetooth enabled electronic equipment, the virtual remote controller being streamed through a wireless connection to said Bluetooth enabled electronic equipment and an Internet connection of the Bluetooth enabled electronic equipment.

2. The system of claim 1 wherein said virtual remote controller is described in an advanced markup language.

3. The system of claim 1 wherein said virtual remote controller is described in Extensible Markup Language (XML).

4. The system of claim 1 wherein a pairing of said Bluetooth enabled electronic equipment with said Bluetooth enabled wireless device requires receipt of a security code at the Bluetooth enabled wireless device.

5. The system of claim 1 wherein said virtual remote controller is displayed through a graphical user interface (GUI) on said Bluetooth enabled wireless device.

6. The system of claim 5 wherein said Bluetooth enabled wireless device includes a touch screen and the GUI is displayed on the touch screen.

7. The system of claim 1 wherein said Bluetooth enabled wireless device is a mobile telephone, a personal digital assistant (PDA), a wireless computer, a wireless keyboard, a digital audio player, or a gaming console.

8. The system of claim 1 wherein said Bluetooth enabled electronic equipment is a television, a digital versatile disc (DVD) player, a video receiver, an audio receiver, a satellite set-top box, a home security system, or a home appliance.

9. A system for remotely controlling a Bluetooth enabled electronic equipment, said system comprising:
said Bluetooth enabled electronic equipment configured to initiate a pairing mode, the pairing mode being initiated responsive to actuation of a selectable control disposed on said Bluetooth enabled electronic equipment, the Bluetooth enabled electronic equipment being in a default non-pairing state when not in pairing mode to reduce cross-talk; and
a Bluetooth enabled wireless device configured to activate a setup mode pair with said Bluetooth enabled electronic equipment, said Bluetooth enabled wireless device configured to communicate with said Bluetooth enabled electronic equipment via a wireless connection, said Bluetooth enabled wireless device streaming a virtual remote controller from the Internet via the wireless connection to the Bluetooth enabled electronic equipment and an Internet connection of the Bluetooth enabled electronic equipment without the virtual remote controller being first stored in the Bluetooth enabled electronic equipment,
wherein said Bluetooth enabled wireless device displays said virtual remote controller and remotely controls said Bluetooth enabled electronic equipment based on the virtual remote controller.

10. The system of claim 9 wherein said virtual remote controller comprises XML files.

11. The system of claim 9 wherein said Bluetooth enabled wireless device is a mobile telephone, a personal digital assistant (PDA), a wireless computer, a wireless keyboard, a digital audio player, or a gaming console.

12. The system of claim 10 wherein said Bluetooth enabled electronic equipment is a television, a digital versatile disc (DVD) player, a video receiver, an audio receiver, a satellite set-top box, a home security system, or a home appliance.

13. A method for utilizing a Bluetooth enabled wireless device to remotely control a Bluetooth enabled electronic equipment, said method comprising:
initiating a pairing mode of said Bluetooth enabled electronic equipment to authorize a virtual remote controller transfer, said initiating being in response to actuation of a selectable control disposed on said Bluetooth enabled electronic equipment, the Bluetooth enabled electronic equipment being in a default non-pairing state when not in pairing mode to reduce cross-talk;
activating a setup mode of said Bluetooth enabled wireless device to pair with said Bluetooth enabled electronic equipment; and
streaming said virtual remote controller to said Bluetooth enabled wireless device from the Internet through a wireless connection between said Bluetooth enabled electronic equipment and the Bluetooth enabled wireless device and an Internet connection of the Bluetooth enabled electronic equipment without the virtual remote controller first being stored in the Bluetooth enabled electronic equipment.

14. The method of claim 13, further comprising displaying said virtual remote controller on said Bluetooth enabled wireless device.

15. The method of claim 14, further comprising remotely controlling the Bluetooth enabled electronic equipment based on activation of command functions of said virtual remote controller displayed on said Bluetooth enabled wireless device.

16. The method of claim 13 wherein said Bluetooth enabled wireless device is a mobile telephone, a personal digital assistant (PDA), a wireless computer, a wireless keyboard, a digital audio player, or a gaming console.

17. The method of claim 13 wherein said Bluetooth enabled electronic equipment is a television, a digital versatile disc (DVD) player, a video receiver, an audio receiver, a satellite set-top box, a home security system, or a home appliance.

18. The method of claim 13 further comprising receiving at the Bluetooth enabled wireless device a security code to authorize control of said Bluetooth enabled electronic equipment by said Bluetooth enabled wireless device.

* * * * *